Aug. 15, 1933.  E. WIEDMANN  1,922,513

FORMING PRESS

Filed Feb. 14, 1931  2 Sheets-Sheet 1

Inventor

ERNST WIEDMANN.

By
Attorney

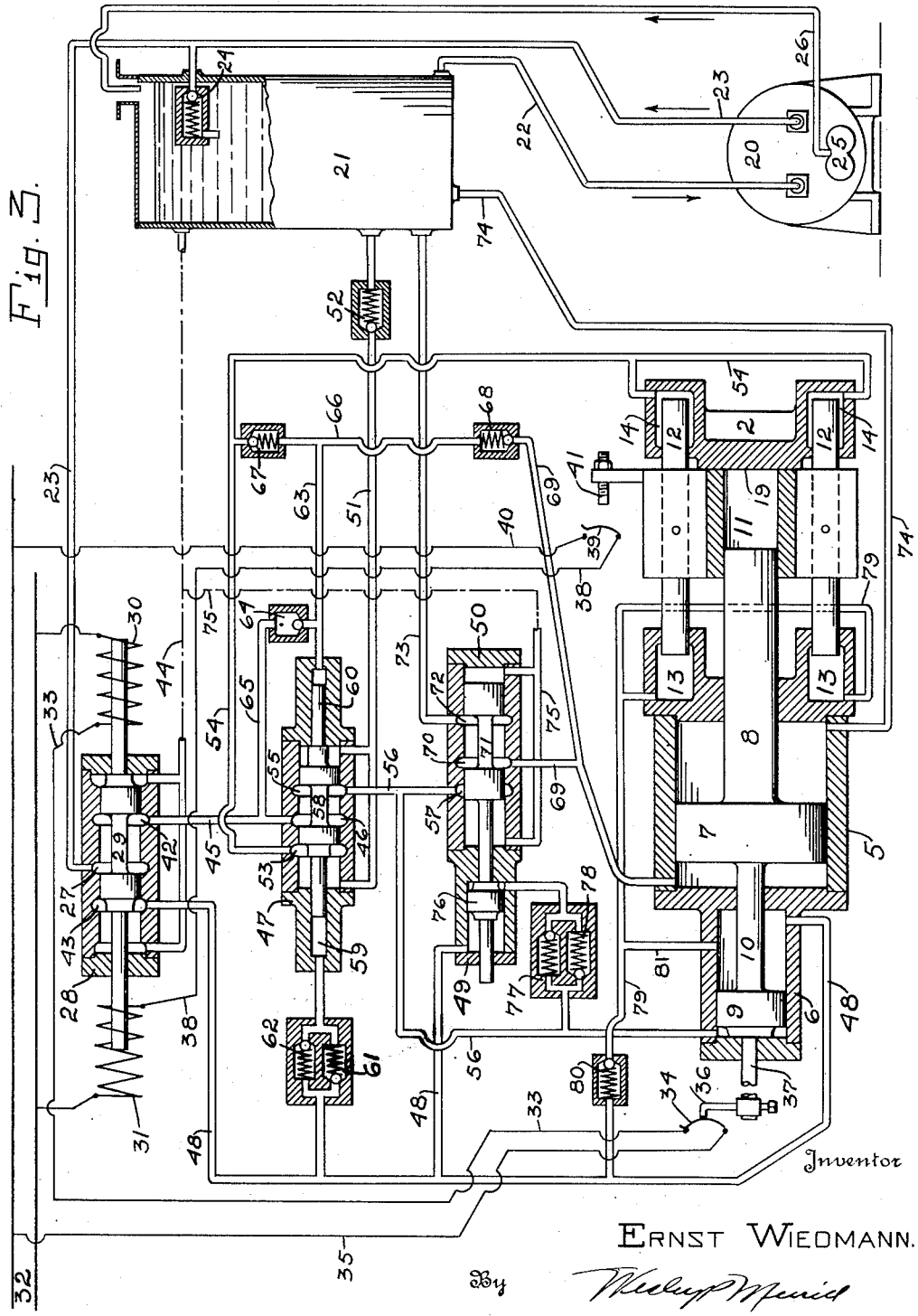

Patented Aug. 15, 1933

1,922,513

UNITED STATES PATENT OFFICE 1,922,513

FORMING PRESS

Ernst Wiedmann, Milwaukee, Wis., assignor to The Oilgear Company, Milwaukee, Wis., a Corporation of Wisconsin Application February 14, 1931. Serial No. 515,712

9 Claims. (Cl. 25—55)

This invention relates to forming presses.

The press to which the invention is particularly adapted is employed for forming briquettes or other articles from divided material and has a mold to receive the material to be molded, a die to compress the material in the mold into a briquette or other article, a hydraulic ram to operate the die and a hydraulic motor to strip the mold from the molded article.

An object of the invention is to facilitate stripping the mold from the molded article.

Another object is to strip the mold from the molded article without injury to either.

Another object is to remove the forming pressure from the molded article before the mold is stripped therefrom.

Another object is to hold the die in position while the mold is being stripped from the molded article.

According to the invention as ordinarily embodied in practice, a forming press is provided with a mold to receive the material to be molded, a die to enter the mold and compress the material therein, means for applying a high forming pressure to the die, means for relieving the die of the forming pressure, means for holding the die against retraction after it has been relieved of the forming pressure, and means for separating the die and the molded material.

The invention is exemplified by the apparatus illustrated in the accompanying drawings in which the views are as follows:

Fig. 3 is a schematic drawing of the hydraulic circuit and shows the press ram and the plungers of the several valves and motors in the positions occupied at the start of a cycle of operation.

Figure 1:
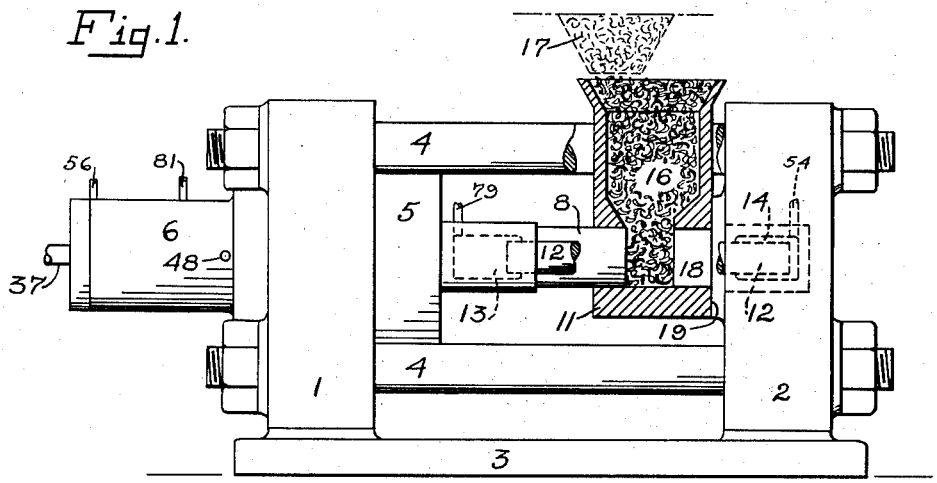
Fig. 1 is a front elevation, partly in section, of a hydraulic press to which the invention has been applied, and shows the ram and the mold retracted.

The invention is shown applied to a press which is employed to form briquettes from fine cast iron scrap, such as cuttings or borings. As the press per se forms no part of the present invention, it has not been illustrated in detail and only a brief description thereof will be given.

The press has two heads 1 and 2 arranged upon a base 3 and rigidly held in spaced relation by four large tie bolts 4.

The head 1 carries a main ram cylinder 5 which has an auxiliary ram cylinder 6 arranged upon its head end in axial alinement therewith.

The main cylinder 5 contains the main piston 7 of a ram 8, and the cylinder 6 contains an auxiliary ram piston 9 which is connected by its rod 10 to the piston 7.

Figure 2:
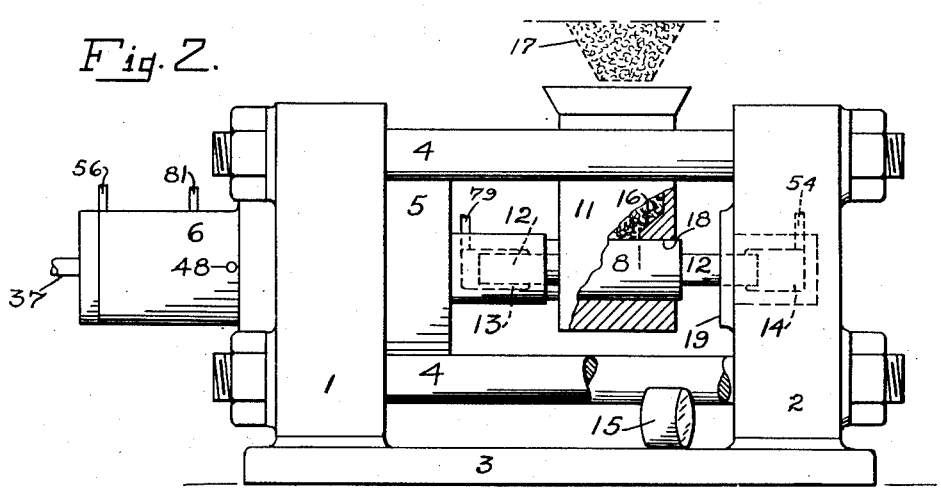
Fig. 2 is a view similar to Fig. 1 but showing the ram and the mold advanced and a briquette which has just been ejected from mold.

The free end of the ram 8 functions as a die and is arranged within a mold 11 rigidly attached to and carried by the two plungers 12 each of which has one of its ends fitted in a cylinder 13 carried by the head 1 and its other end fitted in a cylinder 14 carried by the head 2. The two plungers 12, the two cylinders 13 and the two cylinders 14 constitute a double stripping motor for stripping the mold 11 from a finished briquette 15, such as that shown in Fig. 2.

The mold 11 contains a supply compartment 16 which remains in communication at all times with a spout 17 through which a continuous supply of scrap is delivered.

The lower part of the supply compartment 16 is constricted and communicates with a compression chamber 18 which is slightly larger in diameter than the end of the ram 8 and is arranged in axial alinement therewith.

The compression chamber 18 extends through the wall of the mold 11 and is closed by a face 19 on the head 2 when the mold 11 is in its operative position, as shown in Fig. 1.

When the ram 8 is advanced, its forward end pushes scrap from the supply compartment 16 into the compression chamber 18 and compresses it into a briquette 15. The ram 8 then remains stationary and the stripping motor moves the mold 11 toward the head 1 to the position shown in Fig. 2, and the briquette 15 falls out from between the outside of the mold 11 and the face 19.

A very high pressure is required to compress scrap cast iron into a solid briquette and pressures up to 500 tons are sometimes employed.

If this high pressure is maintained upon the briquette during the stripping operation, the briquette is expanded against the sides of the compression chamber 18, a very large force is required to strip the mold from the briquette, and both the mold and the briquette are injured.

The present invention provides a hydraulic control which allows the mold to be easily stripped from the briquette without injury to either.

As shown diagrammatically in Fig. 3, the driving liquid for operating the press is supplied by a constant delivery pump 20 which receives its supply of liquid from an elevated tank 21 through a pipe 22 and delivers its output into a supply pipe 23. The pressure created by the pump 20 is limited by a high pressure relief valve 24 which is connected to the pipe 23 and discharges into the tank 21. Leakage from the pump 20 is delivered by a gear pump 25 to the tank 21 through a pipe 26.

The supply pipe 23 is connected to the admission port 27 of a magnetically operated reversing valve 28 which has one end of its plunger 29 connected to the core of a solenoid 30 and the other end of its plunger 29 connected to the core of a solenoid 31.

The solenoid 30 has one end of its winding connected to one side of a power line 32 and the other end of its winding connected by a conductor 33 to one terminal of a self-opening electric switch 34 the other terminal of which is connected by a conductor 35 to the other side of the power line 32.

Closing the switch 34 causes the solenoid 30 to be energized and draw the valve plunger 29 to the right, as shown in Fig. 3, and liquid to be delivered to the pressure ends of the ram cylinders to advance the ram.

The switch 34 is closed by an actuator 36 which is secured in an adjusted position upon the tail rod 37 of the auxiliary ram piston 9.

The position of the actuator 36 upon the tail rod 37 determines how far the ram 8 will be retracted and, consequently, determines the thickness of the briquette 15.

The solenoid 31 has one end of its winding connected to one side of the power line 32 and the other end of its winding connected by a conductor 38 to one terminal of a self-opening electric switch 39 the other terminal of which is connected by a conductor 40 to the other side of the power line 32.

Figure 6:
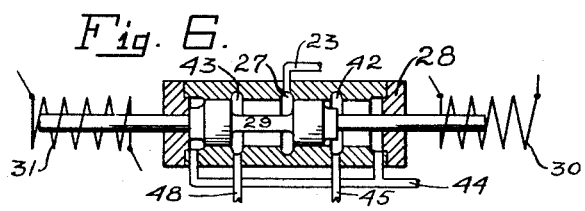
Fig. 6 is a longitudinal section through a reversing valve and shows its plunger in position to direct liquid to the rod end of the ram cylinder and to the other end of the stripping motors.

Closing the switch 39 causes the solenoid 31 to be energized and draw the valve plunger 29 to the left, as shown in Fig. 6, and liquid to be delivered to the rod end of the cylinder 6 and through it to the cylinders 13 to retract the ram and to move the mold against the face 19.

The switch 39 is closed by an adjustable actuator 41 which is carried by the mold 11 and adjusted to close the switch 39 just after the mold has been stripped from the briquette.

The plunger 29 of the reversing valve 28 controls communication between the admission port 27 and two distributing ports 42 and 43 arranged upon either side thereof, and between the distributing ports and the ends of the valve chamber which are connected by a drain pipe 44 to the tank 21.

The port 42 is connected by a pipe 45 to a port 46 in a hydraulically operated valve 47, and the port 43 is connected by a pipe 48 to the forward or rod end of the cylinder 6 and to the outer end of a cylinder 49 which is arranged upon one end of a control valve 50.

The valve 47 is hydraulically operated to deliver pressure liquid either to auxiliary cylinder 6 and the control valve 50 or to the cylinders 14 of the stripping motor, and it has each end of its valve chamber connected to the tank 21 by a discharge pipe 51 which has a resistance valve 52 connected therein and adjusted to open at a low pressure, for instance 100 pounds.

The valve 47 has a port 53 arranged upon one side of the port 46 and connected by a pipe 54 to the outer ends of both cylinders 14, and a port 55 arranged upon the other side of the port 46 and connected by a pipe 56 to a port 57 in the control valve 50 and to the outer or head end of the cylinder 6.

The flow of liquid through the valve 47 is controlled by its plunger 58 which has one of its ends fitted in a cylinder 59 arranged at one end of the valve chamber and its other end fitted in a cylinder 60 arranged at the other end of the valve chamber.

Liquid is supplied to the cylinder 59, for moving the valve plunger 58 to the right to the position shown in Fig. 3, from the pipe 48 through a check valve 61 and, when the plunger 58 is moved to the left, liquid is expelled from the cylinder 59 through a low pressure resistance valve 62 which is connected in parallel with the check valve 61 and is set to open at a low pressure, for instance 100 pounds.

The check valve 61 and the resistance valve 62 are connected between the cylinder 59 and the pipe 48 to prevent the plunger 58 from being moved to the left by pressure liquid which may leak into the cylinder 60.

When the valve plunger 58 is moved to the right, liquid is expelled from the cylinder 60 through a pipe 63, a check valve 64 and a pipe 65 into the pipe 45 and then through the valve 28 into the drain pipe 44.

The pipe 63 has one end connected to the cylinder 60 and its other end connected to a pipe 66 intermediate the ends thereof, and the check valve 64 has its inlet connected to the pipe 63 intermediate the ends thereof and its outlet connected to one end of the pipe 65 the other end of which is connected to the pipe 45 intermediate the ends thereof.

One end of the pipe 66 is connected to the outlet of a check valve 67 which has its inlet connected to the pipe 54 intermediate the ends thereof, and the other end of the pipe 66 is conneced to the outlet of a high pressure resistance valve 68 which is adjusted to open under a high pressure, for instance 1500 pounds.

The inlet of the resistance valve 68 is connected to one end of a pipe 69 which is connected at its other end to the rear or pressure end of the main ram cylinder 5 and connected intermediate its ends to a port 70 in the control valve 50.

Liquid delivered to the cylinder 5 through the control valve 50 and the pipe 69 advances the ram 8 until it stalls against the briquette which it has formed and then pressure rises in the pipe 69 and liquid breaks through the resistance valve 68, enters the cylinder 60 and moves the plunger 58 to the left until it closes the port 55 and opens the port 53 slightly.

Figure 5:
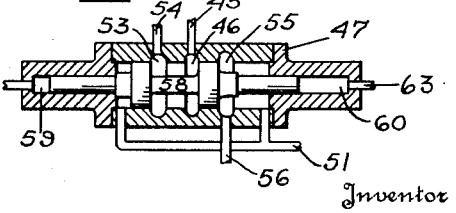
Fig. 5 is a longitudinal section through a hydraulically operated valve and shows its plunger in position to direct driving liquid to one end of the stripping motors.

Closing the port 55 stops the flow of liquid through the resistance valve 68 and the plunger 58 would stop but pressure liquid from the pipe 45 flows through the partly opened port 53, the pipe 54, the check valve 67, the pipe 66 and the pipe 63 into the cylinder 60 and moves the plunger fully to the left into the position shown in Fig. 5.

At the beginning of each cycle of operation, the port 57 is closed by the plunger 71 of the control valve 50 and the port 70 is open to a port 72 which is connected to the lower part of the tank 21 by a pipe 73. The head or pressure end of the cylinder 5 is thus kept flooded with liquid at tank pressure, and the forward or rod end of the cylinder 5 is kept flooded with liquid supplied from the tank 21 through a pipe 74.

The plunger 71 controls communication between the port 70 and the ports 57 and 72 and between the ports 57 and 72 and the ends of the valve chamber which are connected by a drain pipe 75 to the drain pipe 44.

The control valve 50 is operated hydraulically by liquid delivered into the cylinder 49 and acting upon a piston 76 which is fitted therein and secured to the stem of the valve plunger 71.

When liquid is delivered to the cylinder 49 through the pipe 48, the plunger 71 is moved to the right into the position shown in Fig. 3 and the liquid in the inner end of the cylinder 49 is exhausted through a check valve 77 into the pipe 56 and then through the valve 47, the pipe 45 and the valve 28 to the drain pipe 44.

Figure 4:
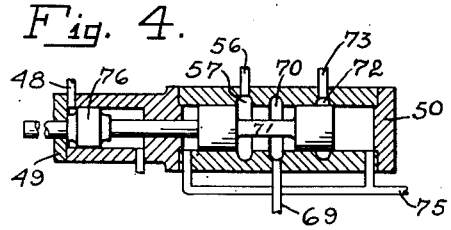
Fig. 4 is a longitudinal section through a control valve and shows its plunger in position to direct driving liquid to the pressure end of the main ram cylinder.

The plunger 71 is moved to the left into position shown in Fig. 4 by liquid delivered from the pipe 56 to the inner end of the cylinder 49 through a resistance valve 78 which is connected in parallel with the check valve 77 and adjusted to open at a relatively high pressure, for instance 1250 pounds.

When liquid is delivered to the stripping motor cylinders 14 and the plungers 12 are advanced, the liquid in the cylinders 13 is exhausted into a pipe 79 which is connected through a check valve 80 with the pipe 48 and connected by a pipe 81 with the cylinder 6 at a point spaced from the inner or rod end thereof.

At the beginning of a cycle of operation, the valve plungers, the ram and the mold are in the positions shown in Fig. 3, and liquid delivered by the pump 20 flows through the supply pipe 23, the valve 28, the pipe 45, the valve 47 and the pipe 56 to the head or pressure end of the auxiliary ram cylinder 6 and advances the ram 8 at high speed.

The liquid in the forward or rod end of the cylinder 6 is exhausted through the pipe 48 and the valve 28 into the drain pipe 44.

The liquid in the forward or rod end of the main cylinder 5 is exhausted through the pipe 74 into the tank 21 and liquid from the tank 21 flows through the pipe 73, the valve 50 and the pipe 69 to keep the head end of the cylinder 5 flooded.

As the ram 8 advances, its forward or die end moves scrap from the supply compartment 16 into the compression chamber 18 and compresses it until the ram stalls and the pressure in the pipe 56 rises sufficiently for liquid to break through the resistance valve 78, enter the inner end of the cylinder 49 and force the piston 76 and the plunger 71 of the valve 50 to the left into the position shown in Fig. 4. The liquid in the outer end of the cylinder 49 is exhausted through the pipe 48 and the valve 28 into the drain pipe 44.

Moving the plunger 71 to the left closes the port 72 and opens the port 57 so that liquid from the pump 20 flows through the valve 50 and the pipe 69 into the cylinder 5 and acts upon the main ram piston 7. The force exerted by the ram 8 upon the scrap in the compression chamber 18 is thus equal to the total force exerted by the high pressure liquid upon both of the pistons 7 and 9 as liquid continues to be delivered through the pipe 56 to the cylinder 6.

When the ram 8 has compressed the scrap in the compression chamber 18 into a substantially solid briquette 15, it stalls and the pressure rises in the pipe 69 until liquid breaks through the resistance valve 68, enters the cylinder 60 and moves the plunger 58 to the left to close the port 55 and partly open the port 53. Then liquid flows through the port 53, the pipe 54, the check valve 67, and the pipes 66 and 63 into the cylinder 60 and forces the plunger 58 fully to the left into the position shown in Fig. 5. The liquid in the cylinder 59 is exhausted through the resistance valve 62, the pipe 48 and the valve 28 into the drain pipe 44.

The port 55 and the pipe 56 are now in communication with the pipe 51 which is connected to the tank 21 through the low pressure resistance valve 52, and the pressure in the head ends of the cylinders 5 and 6 drops to the pressure required to open the valve 52, for instance 100 pounds, and the high forming pressure is thereby removed from the briquette 15 in the chamber 18.

The port 53 is now open to the port 46 and liquid from the pump 20 flows through the pipe 54 to the cylinders 14 and advances the plungers 12 and the mold 11, the liquid in the cylinders 13 being exhausted through the pipe 79, the check valve 80, the pipe 48 and the valve 28 into the drain pipe 44.

The ram 8 is held against retraction by the liquid trapped in the cylinders 5 and 6 under a low pressure by the resistance valve 52, and the mold 11 is pushed clear of the briquette 15 which falls clear of the mold.

When the ram 8 started its advance, the actuator 36 released the switch 34 which opened and deenergized the solenoid 30 but the valve plunger 29 remained in its initial position as it is hydraulically balanced.

At the end of forward movement of the mold 11, the actuator 41 closes the switch 39 and the solenoid 31 is energized and moves the valve plunger 29 to the left into the position shown in Fig. 6, thereby closing the pipe 48 to the drain pipe 44 and opening it to the supply pipe 23 and opening the pipe 45 to the drain pipe 44.

Liquid from the pump 20 now flows through the valve 28 and the pipe 48 to the rod end of the cylinder 6, the outer end of the cylinder 49, and through the check valve 61 to the cylinder 59, and it will move the valve plungers 58 and 71 before it moves the ram 8 due to the difference in weight.

The liquid entering the cylinder 59 moves the valve plunger 58 to the right into the position shown in Fig. 3, and the liquid in the cylinder 60 is exhausted through the pipe 63, the check valve 64, the pipes 65 and 45 and the valve 28 into the drain pipe 44.

The liquid entering the outer end of the cylinder 49 moves the piston 76 and the valve plunger 71 to the right into the position shown in Fig. 3 and the liquid in the other end of the cylinder 49 is exhausted through the check valve 77, the pipe 56, the valve 47, the pipe 45 and the valve 28 into the drain pipe 44.

The liquid entering the cylinder 6 then retracts the ram 8 until the piston 9 uncovers the opening to the pipe 81 and then the liquid flows through the pipe 81 and the pipe 79 to the cylinders 13.

As the ram 8 is heavier and has a greater frictional resistance than the plungers 12 and the mold 11, the ram 8 remains stationary and the liquid entering the cylinders 13 retracts the plungers 12 until the mold 11 abuts the face 19 and then the ram 8 is fully retracted at high speed.

The liquid in the cylinders 14 is exhausted through the pipe 54, the valve 47, the pipe 51 and the low resistance valve 52 into the tank 21.

The liquid in the head end of the cylinder 5 is exhausted through the pipe 69, the valve 50 and the pipe 73 into the tank 21, and liquid from the tank 21 flows through the pipe 74 into the rod end of the cylinder 5 and keeps it flooded as the ram 8 is retracted.

The liquid in the head end of the cylinder 6 is exhausted through the pipe 56, the valve 47, the pipe 45 and the valve 28 into the drain pipe 44.

When the mold 11 is retracted, the actuator 41 releases the switch 39 which opens and thereby deenergizes the solenoid 31 and, when the ram 8 is fully retracted, the actuator 36 closes the switch 34 and energizes the solenoid 30 which draws the plunger 29 of the reversing valve 28 to the right into the position shown in Fig. 3 and starts another cycle of operation.

The invention herein set forth is susceptible of various modifications and adaptations without departing from the scope thereof as hereafter claimed.

The invention is hereby claimed as follows:

1. In a hydraulic press having two reciprocating hydraulic motors operable in opposition to each other and means for delivering liquid to said motors, the combination of means for interrupting the delivery of liquid to one of said motors and for trapping the liquid in that motor to hold its piston against retraction under the thrust of the other motor, and means for reversing both of said motors.

2. In a hydraulic press having two reciprocating hydraulic motors operable in opposition to each other and means for delivering driving liquid to said motors, the combination of means responsive to a predetermined hydraulic pressure for interrupting the delivery of liquid to one of said motors and for trapping the liquid in that motor to hold its piston against retraction under the thrust of the other motor, and means for reversing both of said motors.

3. In a hydraulic press having two reciprocating hydraulic motors operable in opposition to each other and means for delivering driving liquid to said motors, the combination of means for interrupting the delivery of liquid to one of said motors and for trapping the liquid in that motor to hold its piston against retraction under the thrust of the other motor, means for limiting the hydraulic pressure created in the inactive motor by the thrust of the active motor, and means for reversing both of said motors.

4. In a hydraulic press having two reciprocating hydraulic motors operable in opposition to each other and means for delivering driving liquid to said motors, the combination of a valve for interrupting the delivery of liquid to one of said motors and for trapping the liquid in that motor to hold its piston against retraction under the thrust of the other motor, hydraulic means for operating said valve, and means for reversing both of said motors.

5. In a hydraulic press having two reciprocating hydraulic motors operable in opposition to each other and means for delivering driving liquid to said motors, the combination of a valve for interrupting the delivery of liquid to one of said motors and for trapping the liquid in that motor to hold its piston against retraction under the thrust of the other motor, hydraulic means for operating said valve, a resistance valve connected in circuit with said hydraulic means and responsive to a predetermined rise in pressure to pass liquid to said hydraulic means to operate the same, and means for reversing both of said motors.

6. The combination, with a hydraulic press having a mold to receive material to be molded, a die operating in said mold to form said material into an article, a hydraulic ram carrying said die and having its cylinder connected to a source of liquid under pressure, and a hydraulic motor for stripping said mold from said molded article, of means for directing liquid from said source to said ram cylinder to advance said ram and compress the material in said mold, means for then interrupting the delivery of liquid to said ram cylinder and for trapping liquid in said ram cylinder to hold said ram against retraction, means for delivering liquid to said motor to strip said mold from said article, and means for directing liquid to said motor and said ram cylinder to retract said mold and said ram.

7. The combination, with a hydraulic press having a mold to receive material to be molded, a die operating in said mold to form said material into an article, a hydraulic ram carrying said die and having its cylinder connected to a source of liquid under pressure, and a hydraulic motor for stripping said mold from said molded article, of means for directing liquid from said source to said ram cylinder to advance said ram and compress the material in said mold, means responsive to a predetermined increase in hydraulic pressure for then interrupting the delivery of liquid to said ram cylinder and for trapping liquid in said ram cylinder to hold said ram against retraction, means for delivering liquid to said motor to strip said mold from said article, and means for directing liquid to said motor and said ram cylinder to retract said mold and said ram.

8. A press, for forming articles from divided material, comprising a mold to receive said material, a die movable into and out of said mold, means for exerting through said die a high forming pressure upon the material in said mold to compress the same into an article, means for relieving said high forming pressure, means for holding said die against retraction after said forming pressure has been relieved, and means for stripping said mold from said article.

9. A press, for forming articles from divided material, comprising a mold to receive said material, a die, means for moving said die into and out of said mold at high speed, means for exerting through said die a high forming pressure upon the material in said mold to compress the same into an article, means for relieving said high forming pressure, means for holding said die against retraction after said forming pressure has been relieved, and means for stripping said mold from said article.

ERNST WIEDMANN.